July 16, 1968  R. F. LE BOSSE  3,392,774

TIRE

Filed March 25, 1966

INVENTOR
ROBERT F. Le BOSSE

Jack Rosin
ATTORNEY

United States Patent Office 3,392,774
Patented July 16, 1968

3,392,774
TIRE
Robert F. LeBosse, Neuilly-sur-Seine, France, assignor to Societe Francaise du Pneu Englebert, Margny-les-Compiegne, Oise, France, a corporation of France
Filed Mar. 25, 1966, Ser. No. 537,368
Claims priority, application France, Apr. 14, 1965, 13,209
10 Claims. (Cl. 152—361)

ABSTRACT OF THE DISCLOSURE

Pneumatic tire reinforcement belts (1) having one or more plies which include a plurality of parallel cables sandwiched between a layer of hard rubber and a layer of soft rubber or (2) having at least two plies, one of which includes a layer of parallel cables embedded in hard rubber and the other of which includes a layer of parallel cables embedded in soft rubber or (3) having at least one ply of the type set forth in (1) above and at least one or the other or both plies of the type set forth in (2) above.

---

This invention relates to an improved tire and, more particularly, to a tire having an improved circumferential reinforcing belt therein.

Reinforcing belts for tires are conventionally composed of one or more plies with each ply having a plurality of wires, textile cords or metallic strips (hereinafter collectively referred to as "cables") embedded in parallel relationship to one another between two layers of rubber, or other similar material, from a common source. In order to improved the cornering characteristics of the tire and to increase the strength of the reinforcing belt, rubber stocks of high modulus and density are usually employed in making the plies of the reinforcing belt. Although the use of high modulus, hard rubber in making the reinforcing belt provides great strength, the tire thus made becomes rigid and hard riding, causing detriment to the comfort of passengers.

It is therefore an object of this invention to provide a belted tire which gives a more comfortable ride than does a conventional belted tire.

A further object of this invention is to provide a belted tire in which a more comfortable ride is obtained without great sacrifice to the strength and cornering characteristics of the reinforcing belt employed therein.

Further objects and advantages of this invention will become apparent as the following description proceeds.

While the specification concludes with claims particularly pointing out and distinctly claiming the subject matter of this invention, it is believed that the invention will be better understood from the following description taken in conjunction with the accompanying drawings in which:

Briefly stated, a tire in accordance with this invention comprises a carcass of one or more plies of rubber covered, generally radially disposed cords or wires, a tread positioned about the carcass, and a reinforcing belt positioned between the carcass and the tread, the reinforcing belt including one or more layers of parallel cables and at least two layers of rubber or similar material therein, at least one of said layers of rubber comprising soft rubber and another of said layers comprising hard rubber.

In one embodiment of the invention the cables of one ply in the reinforcing belt are embedded in a rubber whose physical characteristics differ from the rubber which surrounds the cables in at least one other ply in the reinforcing belt. In this case the rubber in each individual ply is homogeneous, but physical differences appear in the rubber from one ply to another.

In another embodiment of the invention the cables of at least one individual ply of the reinforcing band are embedded between two layers of dis-similar rubber stock in that ply. Such a ply is hereinafter referred to as heterogeneous.

It is contemplated that a heterogeneous ply can comprise a reinforcing belt either by itself, or in combination with one or more homogeneous plies, or in combination with one or more heterogeneous plies, or in combination with one or more homogeneous and one or ore heterogeneous plies. When it is combined with other plies, whether heterogeneous, homogeneous or both, to make a reinforcing belt, the adjacent layers of adjacent plies may have the same, or different, physical characteristics, as will appear in greater detail hereinafter.

As used herein, the expressions "hard rubber" (Rh) and "soft rubber" (Rs) refer to rubber and rubber-like materials which have Shore A hardnesses respectively above and below an intermediate value of about 70 to 72. The following represent examples of a suitable hard rubber and a suitable soft rubber which can be effectively employed in practing this invention:

| | Soft Rubber | Hard Rubber |
|---|---|---|
| Shore A hardness | 56 | 80 |
| 300% Elongation Modulus, in kg./cm.² | 83 | 170 |
| Tensile strength, in kg./cm.² | 135 | 200 |
| Elongation at break, in percent | 460 | 350 |

The above rubbers can be obtained by utilizing different proportions and different grades of reinforcing blacks, as for example 45 parts of MPC per hundred of rubber (phr.) in the case of soft rubber and 15 parts of FEF and 15 parts of MPC phr. in the case of hard rubber. Similarly, the hardness value of the rubber can be changed by introducing suitable resins thereto.

Figure 1:
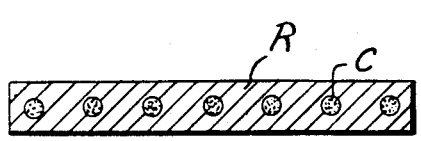
FIG. 1 is a sectional elevational view of a ply in a conventional reinforcing belt.

Referring now to FIG. 1, a conventional ply for a reinforcing belt has been illustrated. Such a ply comprises a plurality of cables C embedded in rubber R, the ply being formed, for example, by positioning the cables C between two layers of rubber from a common source so that the layers have the same physical characteristics and make up a homogeneous whole.

Figure 2:
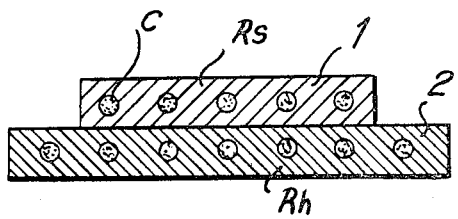
FIG. 2 is a sectional elevational view of a multi-ply reinforcing belt in accordance with one embodiment of this invention.

A two ply reinforcement belt in accordance with this invention has been illustrated in FIG. 2. In this embodiment conventional plies 1 and 2 are provided. However, the cables C of each ply are embedded in a rubber having physical characteristics which differ from those of the other ply. Thus, the cables C of ply 1 are embedded in soft rubber Rs, while the cables of ply 2 are embedded in hard rubber Rh. Alternatively, the cables C of ply 1 could be embedded in hard rubber and the cables of ply 2 could be embedded in soft rubber. In the case of a 4 ply reinforcing belt utilizing the FIG. 2 embodiment, fourteen hard and soft rubber variations are available, in accordance with the following chart:

| Variation No. | Ply 1 | Ply 2 | Ply 3 | Ply 4 |
|---|---|---|---|---|
| 1 | Rh | Rh | Rh | Rs |
| 2 | Rh | Rh | Rs | Rh |
| 3 | Rh | Rs | Rh | Rh |
| 4 | Rs | Rh | Rh | Rh |
| 5 | Rs | Rs | Rs | Rh |
| 6 | Rs | Rs | Rh | Rs |
| 7 | Rs | Rh | Rs | Rs |
| 8 | Rh | Rs | Rs | Rs |
| 9 | Rh | Rh | Rs | Rs |
| 10 | Rs | Rs | Rh | Rh |
| 11 | Rh | Rs | Rs | Rh |
| 12 | Rs | Rh | Rh | Rs |
| 13 | Rh | Rs | Rh | Rs |
| 14 | Rs | Rh | Rs | Rh |

It will be obvious to those skilled in the art that a reinforcing belt according to FIG. 2 does not necessarily have to comprise only an even number of plies. It can also comprise an odd number of plies greater than one, such as three plies or five plies for example.

Figure 3:
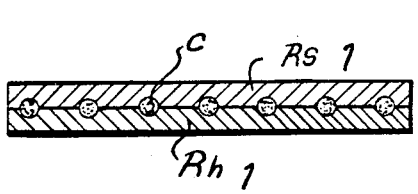
FIG. 3 is a sectional elevational view of a single ply reinforcing belt in accordance with a second embodiment of this invention.

Referring to FIG. 3, there has been illustrated a heterogeneous one-ply embodiment of this invention that may be used in a reinforcing belt which requires only a single layer of cables C. In this case the cables C are embedded between two layers of rubber having different physical characteristics, the upper layer $Rs$ comprising soft rubber and the lower layer $Rh$ comprising hard rubber.

Figure 4:
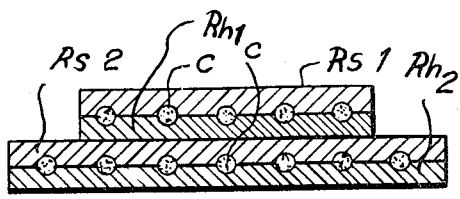
FIG. 4 is a sectional elevational view of a multi-ply reinforcing belt in accordance with a third embodiment of this invention.
Figure 5:
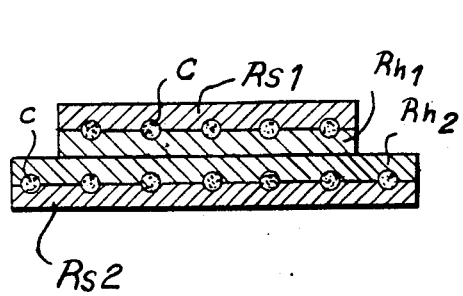
FIG. 5 is a sectional elevational view of a multi-ply reinforcing belt in accordance with a fourth embodiment of this invention; and, FIG. 6 is a sectional elevational view of a multi-ply reinforcing belt in accordance with a fifth embodiment of this invention.

FIGS. 4 and 5 illustrate multi-ply reinforcing bands made solely from heterogeneous plies of the type shown in FIG. 3. In FIG. 4 the heterogeneous plies are assembled in such a manner that the hard rubber layer $Rh1$ of the upper ply is in contact with the soft rubber layer $Rs2$ of the lower ply, the hard and soft layers being in alternating sequence in the reinforcing belt. In FIG. 5 the heterogeneous plies are assembled in such a manner that the hard rubber layer $Rh1$ of the upper ply is in contact with the hard rubber layer $Rh2$ of the lower layer.

As in the case of the FIG. 2 embodiment, numerous variations involving only heterogeneous plies are available for multi-ply reinforcing belts of the FIGS. 4 and 5 embodiments. The following chart illustrates the possible variations of rubber layers in the case of reinforcing belts made of two heterogeneous plies:

| Variation No. | Ply 1 | | Ply 2 | |
|---|---|---|---|---|
| | Upper | Lower | Upper | Lower |
| 1 | Rh | Rs | Rh | Rs |
| 2 | Rs | Rh | Rs | Rh |
| 3 | Rs | Rh | Rh | Rs |
| 4 | Rh | Rs | Rs | Rh |

The following chart illustrates the possible variations available in the case of reinforcing belt made of four heterogeneous plies:

| Variation No. | Ply 1 | | Ply 2 | | Ply 3 | | Ply 4 | |
|---|---|---|---|---|---|---|---|---|
| | Upper | Lower | Upper | Lower | Upper | Lower | Upper | Lower |
| 1 | Rh | Rs | Rh | Rs | Rh | Rs | Rh | Rs |
| 2 | Rh | Rs | Rh | Rs | Rh | Rs | Rs | Rh |
| 3 | Rh | Rs | Rh | Rs | Rs | Rh | Rh | Rs |
| 4 | Rh | Rs | Rh | Rs | Rs | Rh | Rs | Rh |
| 5 | Rh | Rs | Rs | Rh | Rh | Rs | Rh | Rs |
| 6 | Rh | Rs | Rs | Rh | Rh | Rs | Rs | Rh |
| 7 | Rh | Rs | Rs | Rh | Rs | Rh | Rh | Rs |
| 8 | Rh | Rs | Rs | Rh | Rs | Rh | Rs | Rh |
| 9 | Rs | Rh | Rh | Rs | Rh | Rs | Rh | Rs |
| 10 | Rs | Rh | Rh | Rs | Rh | Rs | Rs | Rh |
| 11 | Rs | Rh | Rh | Rs | Rs | Rh | Rh | Rs |
| 12 | Rs | Rh | Rh | Rs | Rs | Rh | Rs | Rh |
| 13 | Rs | Rh | Rs | Rh | Rh | Rs | Rh | Rs |
| 14 | Rs | Rh | Rs | Rh | Rh | Rs | Rs | Rh |
| 15 | Rs | Rh | Rs | Rh | Rs | Rh | Rh | Rs |
| 16 | Rs | Rh | Rs | Rh | Rs | Rh | Rs | Rh |

It will be apparent that in the FIGS. 4 and 5 embodiments reinforcing belts can be made from one, two, three, four or more heterogeneous plies, and that this embodiment is not limited to any particular even or odd number of plies.

Figure 6:
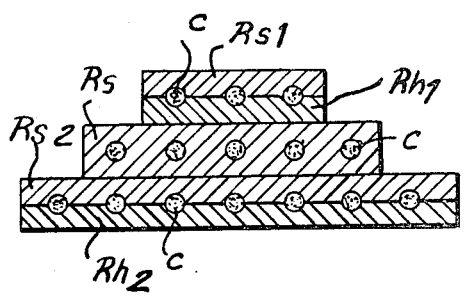

Referring now to FIG. 6, there has been illustrated yet another embodiment of this invention. In this case the center ply is homogeneous, while the upper and lower plies are heterogeneous. Here, again, numerous permutations and combinations of rubber layers having different physical characteristics are available, and the number of and positions of the homogeneous and heterogeneous plies can be changed as desired so long as at least one of each is present. In the example shown, a three ply reinforcing belt has been illustrated. However, it will be apparent that this embodiment can be utilized with any even or odd number of plies greater than one.

From the foregoing discussion, it will be seen that this invention provides a belted tire which allows a more comfortable ride than a conventional belted tire, the added comfort being obtained without great loss of strength by incorporating at least one layer of soft rubber with the usual one or more layers of hard rubber in a reinforcing belt.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described the invention, what is claimed as new and desired to be protected by Letters Patent is:

1. In a tire including an inner carcass portion of one or more plies of rubber covered cords or wires and a tread portion surrounding said carcass portion, a reinforcing belt positioned between said carcass portion and said tread portion, comprising at least one layer of parallel cables and at least two layers of rubber, at least one of said layers of rubber having a Shore A hardness of under 70 and another of said layers of rubber having a Shore A hardness of over 72, said parallel cables being embedded between said two layers of rubber to form a single heterogeneous ply.

2. A reinforcing belt as described in claim 1 and further including a second heterogeneous ply having a layer comprising a plurality of parallel cables embedded between a layer of rubber having a Shore A hardness of under 70 and a layer of rubber having a Shore A hardness of over 72.

3. A reinforcing belt as described in claim 2 in which said heterogeneous plies are arranged in such a manner as to form alternating layers of rubber having different hardnesses.

4. A reinforcing belt as described in claim 2 in which said heterogeneous plies are arranged in such a manner that the adjacent layers of two successive plies are of the same hardness.

5. A sheet material for use in tires, comprising a layer of parallel cables embedded between first and second layers of rubber, said first layer of rubber having a Shore A hardness of under 70 and said second layer of rubber having a Shore A hardness of over 72.

6. In a tire including an inner carcass portion of one or more plies of rubber covered cords or wires and a tread portion surrounding said carcass portion, a reinforcing belt positioned between said carcass portion and said tread portion, comprising at least two plies, each ply including a layer of parallel cables embedded in rubber, at least a portion of the rubber of one of said plies having a Shore A hardness of under 70, and at least a portion of the rubber of the other of said plies having a Shore A hardness of over 72.

7. A reinforcing belt as described in claim 6 wherein the rubber in at least one of said plies is homogeneous.

8. A reinforcing belt as described in claim 7 wherein the rubber in each of said plies is homogeneous.

9. A reinforcing belt as described in claim 7 wherein another of said plies is heterogeneous.

10. A reinforcing belt as described in claim 9 and further including a third ply having a layer of parallel cables embedded in rubber, said third ply being heterogeneous, said homogeneous ply being positioned between said two heterogeneous plies.

References Cited

UNITED STATES PATENTS 2,811,998    11/1957    Bourdon _____ 152—361

FOREIGN PATENTS 770,315    7/1954    Great Britain.

ARTHUR L. LA POINT, *Primary Examiner.*

C. B. LYON, *Assistant Examiner.*